(12) United States Patent
Ozaki et al.

(10) Patent No.: US 6,623,590 B2
(45) Date of Patent: *Sep. 23, 2003

(54) SUPPORT FOR PHOTOGRAPHIC PAPER AND ITS PRODUCTION

(75) Inventors: Kazuo Ozaki, Shizuoka (JP); Tadahiro Kegasawa, Shizuoka (JP); Ryuichi Katsumoto, Shizuoka (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,027

(22) Filed: Jul. 28, 1999

(65) Prior Publication Data

US 2003/0003313 A1 Jan. 2, 2003

(30) Foreign Application Priority Data

Sep. 30, 1998 (JP) .......................... 10-277315
Jul. 30, 1998 (JP) .......................... 10-214962

(51) Int. Cl.$^7$ .......................... B29C 47/06; G03C 1/79
(52) U.S. Cl. .......................... 156/244.23; 156/244.11; 156/244.26; 156/244.27; 156/272.6
(58) Field of Search .......................... 428/513, 514, 428/341, 342; 156/244.11, 244.23, 244.26, 244.27, 272.6

(56) References Cited

U.S. PATENT DOCUMENTS

| | | | | |
|---|---|---|---|---|
| 3,284,380 A | * | 11/1966 | Davis | 428/513 |
| 4,994,357 A | | 2/1991 | Uno et al. | 430/536 |
| 5,328,749 A | | 7/1994 | Noda et al. | 428/195 |
| 5,387,630 A | * | 2/1995 | Edwards et al. | 524/210 |
| 6,107,014 A | * | 8/2000 | Dagan et al. | 430/496 |

FOREIGN PATENT DOCUMENTS

| | | |
|---|---|---|
| EP | 0 662 663 | 7/1995 |
| EP | 0 704 753 | 4/1996 |
| EP | 0 952 483 | 10/1999 |

OTHER PUBLICATIONS

European Search Report for EP 99 11 4267 dated Oct. 5, 2001, Sep. 24, 2001.

* cited by examiner

Primary Examiner—D. S. Nakarani
(74) Attorney, Agent, or Firm—Sughrue Mion, PLLC

(57) ABSTRACT

This invention provides a support for photographic paper being excellent in whiteness and flatness and inexpensive, and having a sufficient adhesive strength of resin which can be generated even at a low resin temperature of 200 to 280° C. through a high speed processing of 100 m/min or more, which comprises a base having a whiteness of 75% or more and a flatness Ra of 20 μm or less, and a polyolefin resin composition membrane comprising a polyolefin resin and unsaturated bond at a rate of 0.2 or more unsaturated bonds per 1,000 carbon atoms.

8 Claims, 1 Drawing Sheet

SUPPORT FOR PHOTOGRAPHIC PAPER AND ITS PRODUCTION

BACKGROUND OF THE INVENTION

This invention relates to a support for photographic paper being excellent in whiteness and having a sufficient adhesive strength which can be generated even through a high processing speed and a low extrusion resin temperature, and its production.

Extrusion laminating (also called extrusion coating) is widely used for the production of a support for photographic paper, wherein thermoplastic resin, such as polyolefin is melted and extruded onto the base, such as paper, in a shape of film, followed by pressing by passing a nip roller or the like to obtain the resin-coated support. In order to ensure the adhesion of resin to the base, it is necessary that the temperature of the molten resin is more than 280° C. The base is usually treated with the surface treatment, such as the corona treatment or the flame treatment.

Under such a high temperature, resin tends to deteriorate, and gels (oxidized deteriorated resin) and streaks generate frequently. Accordingly, it was desired to lower the resin temperature upon laminating. Besides, it is necessary to raise processing speed in economical viewpoint, and it was desired to process at a high speed of 100 m/min or more.

However, lowering of the molten resin temperature and speed up of the processing speed results in the degradation of adhesive strength of resin to the base. Moreover, the base used for a support for photographic paper is essentially excellent in whiteness and flatness, and as a result, the base is inferior in adhesiveness due to its small surface roughness and inferior anchoring effect.

Accordingly, it is necessary to take a means for improving the adhesiveness. As such a means, there are the treatment of the molten resin layer with ozone, the surface treatment of the base, blending of adhesive resin to the molten resin, multilayer laminating provided with an adhesive resin layer arranged on the base side, applying anchoring agent to the base, and the like. However, adhesive resin is expensive, and anchoring agent also increases the cost caused by the great load on drying, etc.

Moreover, various means for improving the adhesive strength of resin to the base upon extrusion coating of the base with the resin were developed, such as the ozone treatment disclosed in Japanese Patent KOKOKU 61-42254 and Japanese Patent KOKAI 3-263035, the anchor coating disclosed in Japanese Patent KOKOKU 62-60970, a combination of the ozone treatment, the corona treatment and the flame treatment disclosed in Japanese Patent KOKAI 8-190171, etc.

However, by the above conventional methods, it is difficult to ensure sufficient adhesiveness, and nevertheless, the manufacturing cost is increased. Accordingly, it was still desired to develop a means capable of ensuring sufficient adhesiveness inexpensively, even employing a lower resin temperature and a high speed processing.

SUMMARY OF THE INVENTION

An object of the invention is to provide a support for photographic paper being excellent in whiteness and flatness and inexpensive, and having a sufficient adhesive strength of resin which can be generated even at a low resin temperature of 200 to 280° C. through a high speed processing of 100 m/min or more, and a method of producing it.

The inventors investigated eagerly in order to achieve the above object, and found that the adhesiveness is improved by using a base being excellent in whiteness and flatness and incorporating unsaturated bonds into polyolefin resin.

The present invention has been completed by the finding, and provides a support for photographic paper which comprises a base having a whiteness of 75% or more and a flatness Ra of 20 μm or less, and a polyolefin resin composition membrane comprising a polyolefin resin and unsaturated bond at a rate of 0.2 or more unsaturated bonds per 1,000 carbon atoms.

The unsaturated bonds may be bonded to an end of polymer chain of the polyolefin or in a compound.

Moreover, they further found that the adhesiveness is remarkably improved by surface treating of the resin surface by ozone gas or the base surface by an activating treatment, such as the corona treatment or the flame treatment.

In other words, by incorporating unsaturated bonds, the effect of the surface treatment, such as the ozone treatment, of the molten resin film is increased, and the low temperature high speed processing at 200 to 280° C. at 100 m/min or more can be achieved in combination with the surface treatment of molten resin film and the base.

Figure 1:
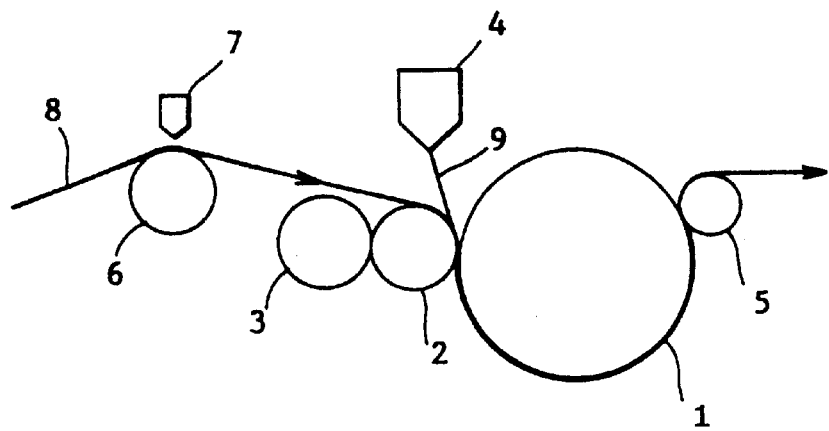
FIG. 1 is a schematic illustration at the laminating portion of an extrusion laminating apparatus capable of producing the support for photographic paper of the invention.

1 . . . Cooling roller
2 . . . Nip roller
3 . . . Back-up roller
4 . . . Extruding die
5 . . . Releasing roller
6 . . . Corona treatment roller
7 . . . Corona treating machine
8 . . . Base
9 . . . Molten resin film
10 . . . Ozone blowing nozzle

DETAILED DESCRIPTION OF THE INVENTION

In an aspect of the invention, the unsaturated bond is vinyl group ($CH_2$=CH—) bonded to at least one end of polymer chain, and a suitable number of vinyl groups is 0.2 to 0.9, preferably 0.25 to 0.85, more preferably 0.45 to 0.85, vinyl group per 1,000 carbon atoms of polyolefin including the vinyl group. When the number of the vinyl group is less than 0.2 per 1,000 carbon atoms, the effect of improving adhesiveness is insufficient. When exceeding 0.9 per 1,000 carbon atoms, viscosity is sharply decreased resulting in the occurrence of a problem in extrusion.

The polyolefin resin having vinyl group at least an end of the polymer chain can be produced by various methods. For example, in the high pressure radical polymerization process, it can be produced by feeding ethylene and propylene continuously. As the reactor, a tubular reactor or an autoclave reactor is used, and the polymerization is carried out at a pressure of 500 to 3,500 kg/cm$^2$ at a polymerization temperature of 100 to 400° C. in the presence of an organic or inorganic peroxide as the radical polymerization initiator.

In another aspect of the invention, the unsaturated bond is in a compound, and a suitable number of the unsaturated bonds is 0.2 or more, preferably 0.25 or more, more preferably 0.45 or more, per 1,000 carbon atoms in the total of polyolefin and the compound having the unsaturated bond. When the number of the unsaturated bond is less than 0.2 per 1,000 carbon atoms, the effect of improving adhesiveness is insufficient. The upper limit of the number of the unsaturated bonds is 400 or less, preferably 300 or less, more preferably 250 or less.

The compound having intramolecular unsaturated bond has plural unsaturated bonds in the molecule, and illustrative of the compounds are polybutadiene, preferably 1,2-polybutadiene, polyisoprene, natural rubber, ethylene-propylene-diene terpolymer, and a compound, oligomer and polymer selected from ethylene-allyl acrylate or allyl methacrylate, and ethylene-vinyl acrylate or vinyl methacrylate. Preferable compounds are 1,2-polybutadiene, ethylene-propylene-diene copolymer (EPDM) and polyisoprene, and 1,2-polybutadiene is particularly preferred in terms of handling, workability, and the like. Two or more compounds may be combined.

The polyolefin resin is polyethylene resin, polypropylene resin or the like, and polyethylene resin is preferable. The polyethylene resin may be any one of high density polyethylene, low density polyethylene or linear low density polyethylene. Two or more polyolefin resins may be combined.

It is effective to use a polyolefin resin having a relatively low melt viscosity on the improvement in the adhesiveness by intruding the polyolefin resin into indentations of the surface roughness (anchoring effect), particularly for a base having a considerable surface roughness. Therefore, the MI of the resin is preferably in the range of 2 to 100 g/10 minutes, more preferably 5 to 90 g/10 minutes, particularly preferably 8 to 80 g/10 minutes. When the MI value is less than 2 g/10 minutes, the anchoring effect is small. When the MI value exceeds 100 g/10 minutes, extrusion processing ability is degraded due to its too low viscosity. The MI value is a measure of the fluidity of melted thermoplastic resin, and is measured by using the extrusion type plastometer regulated by JIS K 7210, extruding a thermoplastic resin from an orifice at a constant temperature and pressure, and converting the extruded amount of the thermoplastic resin to the number of grams per 10 minutes.

A suitable thickness of the polyolefin resin composition membrane is 10 to 100 $\mu$m, preferably 15 to 50 $\mu$m.

In order to improve whiteness, in general, titanium dioxide is added as filler. The titanium dioxide may be in the anatase type or the rutile type. The anatise type titanium dioxide is preferable for the improvement in whiteness, and the rutile type titanium dioxide is preferable for the improvement in sharpness. The anatase type titanium dioxide and the rutile type titanium dioxide may be blended by considering sharpness and whiteness. A titanium dioxide-containing layer may be divided into two layers, to one of which the anatase type titanium dioxide, and to the other of which the rutile type titanium dioxide.

A preferable mean particle size of titanium dioxide is 0.1 to 0.4 $\mu$m. The titanium dioxide having a mean particle size of less than 0.1 $\mu$m is difficult to disperse uniformly in the membrane layer. The titanium dioxide having a mean particle size of more than 0.4 $\mu$m makes granular projections on the surface of the membrane layer which adversely affect picture quality as well as not obtaining sufficient whiteness. The titanium dioxides having the form and the mean particle size are commercially available ("KA-10", "KA-20" Titanium Kogyo, "A-220", "PF-656", "PF-654", "PF-671", "PF-715", "CR-63", Ishihara Sangyo).

In order to prevent yellowing by inhibiting its activity, it is preferable to use a surface-treated titanium dioxide of which the surface has been treated with an inorganic substance, such as hydrous aluminum oxide or hydrous silicon dioxide, an organic substance, such as polyol, polyvalent amine, metal soap, alkyl titanate or polysiloxane, or a combination of the inorganic subtance and the organic substance. A suitable amount is 0.2 to 2 wt. % for the inorganic substance, 0.1 to 1 wt. % for the organic substance, per the weight of titanium dioxide.

Titanium dioxide is kneaded into a water-resistant resin using a dispersion assistant, such as higher fatty acid metal salt, higher fatty acid ethyl ester, higher fatty amide, or higher fatty acid, by a kneader, such as a twin roll mill, a three-roll mill, a kneader or a Banbury mixer. The kneaded water-resistant resin containing titanium dioxide is pelletized and served as a titanium dioxide masterbatch. A suitable titanium dioxide concentration of the masterbatch is 30 to 75 wt. %, preferably 35 to 70 wt. %, in the viewpoint of economy, dispersibility, and the like. The titanium dioxide concentration of less than 30 wt. % is unfavorable in the economical viewpoint due to a small dilution ratio. The titanium dioxide concentration of more than 75 wt. % is inferior in the dispersion thereof, and cracking tends to occur upon bending. A suitable amount of the dispersion assistant is, in general, about 0.5 to 10 wt. % of titanium dioxide.

It is preferable to blend bluing agent with the polyolefin resin composition of the invention. Suitable bluing agents are Ultramarine Blue, Cobalt Blue, cobalt phosphate oxide, quinacridone-based pigment, mixture thereof, and the like. A suitable mean particle size of the bluing agent is in the range of 0.05 to 5 $\mu$m, preferably 0.1 to 3 $\mu$m, in view of the improvement in resolving power. A suitable bluing agent content of the polyolefin resin composition is, in the case of adding the bluing agent to the upper layer side, 0 to 0.56 wt. %, preferably 0.05 to 0.4 wt. %, particularly preferably 0.07 to 0.3 wt. %. In the range of exceeding 0.56 wt. %, although the resolving power (sharpness) is improved, images are tinged with blue to degrade the value as commercial goods. In the case of adding the bluing agent to the lower layer side, a suitable content is 0.05 to 0.6 wt. %, preferably 0.07 to 0.45 wt. %, particularly preferably 0.10 to 0.3 wt. %. In the range of less than 0.05 wt. %, the low frequency CTF value lowers, and the improvement in resolving power is small.

The bluing agent is kneaded into resin by a kneader, such as a twin roll mill, a three-roll mill, a kneader or a Banbury mixer. The kneaded resin containing the bluing agent is pelletized and served as a bluing agent masterbatch. A suitable bluing agent concentration of the masterbatch is about 1 to 30 wt. %, in the viewpoint of economy, dispersibility, and the like. It is possible to blend titanium dioxide together with the bluing agent. A dispersion assistant, such as low molecular weight water-resistant resin, higher fatty acid metal salt, higher fatty ester, higher fatty amide or higher fatty acid, may be added in order to assist the dispersion of the bluing agent.

The polyolefin resin composition may contain antioxidant, and a suitable antioxidant content is about 50 to 1,000 ppm against the resin amount, because of preventing resin deterioration without adverse affects on photographic properties.

The masterbatch pellets containing titanium dioxide and/or bluing agent thus produced is suitably diluted by resin, and served to application.

A suitable content of the filler is 5 to 45 wt. %, preferably 10 to 30 wt. %.

Photographic paper is required to be excellent in whiteness and flatness, because it is a medium for forming image. Therefore, the base for photographic paper is also required to be excellent in whiteness and flatness. As a suitable whiteness, the quantity of reflected light from a sample at a wavelength of 440 nm using a light source containing low wavelength light capable of emitting fluorescent color is 75% or more, preferably 80% or more, more preferably 85% or more. A suitable flatness is 20 µm or less, preferably 10 µm or less as Ra.

The base used in the invention is conventional natural pulp paper composed of natural pulp as the principal component, mixed pulp paper composed of natural pulp and synthetic fiber, synthetic fiber paper composed of synthetic fiber as the principal component, synthetic paper which is pseudo-paperized synthetic resin film, such as polystyrene or polypropylene, white polyester film, white foamed film or the like, and natural pulp paper (hereinafter simply referred to as base paper) is the most preferred.

As the additives to the base paper, there are filler, such as clay, talc, calcium carbonate or urea resin particulates, sizing agent, such as rosin, higher fatty acid metal salt, paraffin wax or alkenyl succinic acid, paper reinforcing agent, such as polyacrylamide, fixing agent, such as aluminum sulfate, and the like, as well as alkyl ketene dimer.

Optionally, the following softening agent may be added. Softening agent is disclosed in, e.g. "Shin Kami Kako Binran (New Paper Processing Handbook)", pp 554–555, Shigyo Times, 1980, and the softening agent having a molecular weight of 200 or more is preferred. The softening agent has a hydrophobic group having 10 or more carbon atoms, and is in a form of amine salt or quaternary ammonium salt having self-fixing ability to cellulose.

Illustrative of preferable softening agents are the reaction product of maleic anhydride copolymer and polyalkylene-polyamine, the reaction product of higher fatty acid and polyalkylene-polyamine, the reaction product of urethane alcohol and alkylating agent, quaternary ammonium salt, and the like, and the reaction product of maleic anhydride copolymer and polyalkylene-polyamine and the reaction product of urethane alcohol and alkylating agent are particularly preferred.

The surface of pulp can be treated with surface sizing by a film-forming polymer, such as gelatin, starch, carboxylmethyl cellulose, polyacrylamide, polyvinyl alcohol, modified polyvinyl alcohol, or the like. Illustrative of the modified polyvinyl alcohols are carboxyl group-modified ones, silanol-modified ones, and copolymers with acrylamide. A suitable coating amount of the film-forming polymer is 0.1 to 5 $g/m^2$, preferably 0.5 to 2 $g/m^2$. To the film-forming polymer, optionally, antistatic agent, fluorescent brightening agent, pigment, antifoamer, or the like can be added.

The base paper is made by paper-making the aforementioned pulp slurry containing pulp and optional additives, such as filler, sizing agent, paper reinforcing agent, fixing agent, etc., by a paper-making machine, such as a Fourdrinier machine, drying, and then, winding up. The aforementioned surface sizing is carried out before or after the drying, and calendering is carried out after the drying before the winding up.

In the case that the surface sizing is carried out after the drying, either the surface sizing or the calendering can precede, but it is prefeable that the calendering is carried out in the final finishing process after conducting various treatments. The metal roll and elastic roll used for the calendering may be known ones used for the conventional paper production. The base paper used for the support for photographic paper is adjusted finally to a thickness of 50 to 250 µm. A suitable density of 0.8 to 1.3 $g/m^3$, preferably 1.0 to 1.2 $g/m^3$.

It is preferable to provide extruded molten resin film which becomes the polyolefin resin composition membrane and the base with surface treatment in order to improve adhesiveness. Preferable surface treatments for the molten resin film are ozone treatment, corona treatment, blowing of oxygen-rich gas, and the like, and preferable surface treatments for the base are corona treatment, flame treatment, anchor coating, plasma treatment, glow discharge treatment, and the like.

In the ozone treatment provided for the molten resin film, a preferable ozone treating amount is 5 to 300 mg ozone/$m^2$. In the range of less than 5 mg ozone/$m^2$, the effect of ozone treatment is insufficient. In the range of more than 300 mg ozone/$m^2$, effluence of ozone gas increases to affect adversely working atmosphere. The object of the improvement in adhesiveness can also be achieved by other means for stimulating oxidation of the surface of the molten resin film, such as corona discharge or blowing of oxygen-rich gas. The oxidation degree according to ESCA was 0.005 to 0.05.

In the corona treatment provided for the base, a preferable corona treating amount is 10 to 80 $W/m^2$·min. In the range of less than 10 $W/m^2$·min, the improvement in adhesiveness is insufficient. In the range of more than 80 $W/m^2$·min, defects occur on the base, such as pinholes, due to too great treating amount.

In the flame treatment provided for the base, a preferable output is 3,000 to 40,000 BTU/inch·hr. In the range of less than 3,000 BTU/inch·hr, the treating effect is small. In the range of more than 40,000 BTU/inch·hr, the damage of the base is too great. Moreover, a preferable plasma index value is 20 to 95. In the ranges of less than 20 and more than 95, the treating effect is small. The plasma index value is the mixing ratio of air/gas v/v.

According to the invention, it is possible to obtain a support for photographic paper having a sufficient adhesiveness of the resin membrane to the base, excellent whiteness and flatness without increasing manufacturing cost, even under low temperature, high speed processing. Since the extrusion resin temperature can be lowered, oxidation of resin is prevented. As a result, since yellowing of resin by oxidation is prevented, the blending amount of color-adjusting agent (fluorescent brightening agent, Ultramarine Blue, etc.) can be decreased.

Figure 2:
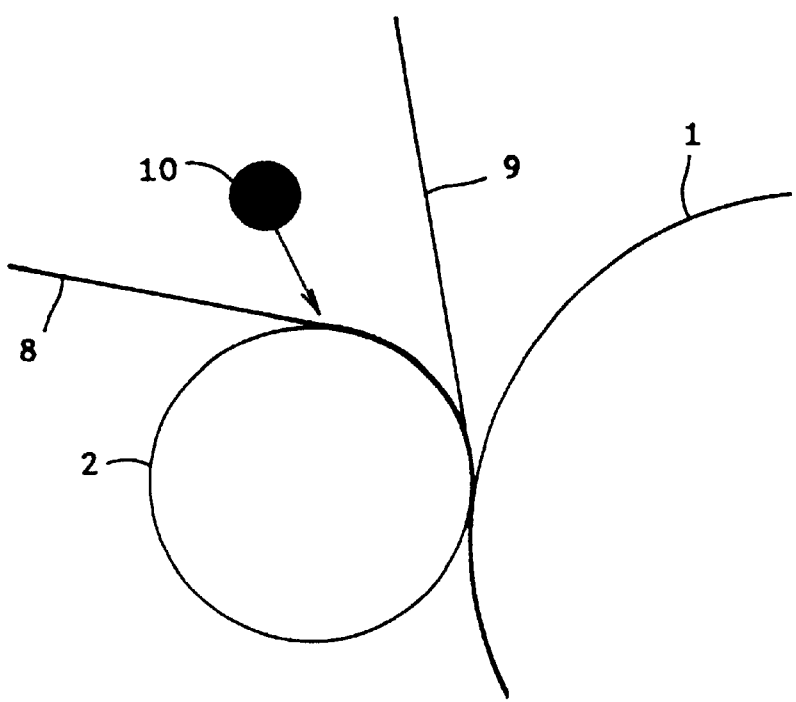
FIG. 2 is an enlarged partial view therof provided with an ozone blowing nozzle.

An extrusion laminating apparatus capable of producing the support for photographic paper of the invention is illustrated in FIGS. 1 and 2.

The apparatus is constituted of a cooling roller 1, a nip roller 2 contacted with the cooling roller 1, a back-up roller 3 of the nip roller 2, a corona treatment roller 6 located on the upstream side of the cooling roller 1 and the nip roller 2, a corona treating machine 7 located above the corona treatment roller 6, an extruding die 4 for the extrusion of the polyolefin resin composition located above the nip roller 2, and a releasing roller 5 located on the downstream side of the cooling roller 1.

The base 8 enters from the left side in FIG. 1, and is treated with corona treatment by the corona treating machine 7 immediately before laminating with the molten resin film 9. The molten resin film 9 is extruded from the die 4 onto the base 8, and nipped by passing between the cooling roller 1 and the nip roller 2 to adhere strongly to the base by the nip pressure, etc. Then, the molten resin film is cooled to solidify during traveling on the cooling roller 1, and separated therefrom at the releasing roller 5. Optionally, as shown in FIG. 2, an ozone blowing nozzle 10 is provided above the nip roller 2, and the surface of the base is treated with ozone immediately before laminating with the molten resin film 9.

EXAMPLES

Examples 1–9, Comparative Examples 1–3, 6, 7

Polyolefin resin compositions were prepared by blending 10 wt. % titanium dioxide, 0.07 wt. % Ultramarine Blue and 0.001 wt. % fluorescent brightening agent with various low density polyethylene resins of which end(s) of the polymer chain vinyl groups were bonded to. Each of the polyolefin resin compositions was melted at 250° C. and laminated in a thickness of 30 μm to a base paper having a thickness of 175 μm, a width of 300 mm, a whiteness of 90% and a flatness Ra of 5 μm.

Δ. . . Peelable without so care. Practical level without problem.
X . . . Easily peelable.
The results are summarized in Table 1.

TABLE 1

| | Used Resin | Line Speed [m/min] | Corona Treatment [W/m² · min] | Flame Treatment [Plasma Index Value/Heat Quantity (BTU/inch · hr)] | Ozone Treatment [mg/m²] | Adhesion | Whiteness [%] | Surface Roughness |
|---|---|---|---|---|---|---|---|---|
| Example | | | | | | | | |
| 1 | Resin A | 200 | 50 | 0 | 50 | ○ | 96 | 0.8 |
| 2 | Resin A | 300 | 50 | 0 | 50 | ○ | 96 | 0.8 |
| 3 | Resin A | 300 | 0 | 80/10000 | 50 | Δ | 96 | 0.8 |
| 4 | Resin B | 200 | 50 | 0 | 50 | ○ | 96 | 0.8 |
| 5 | Resin B | 300 | 50 | 0 | 50 | ○ | 96 | 0.8 |
| 6 | Resin B | 300 | 0 | 80/10000 | 50 | Δ~○ | 96 | 0.8 |
| 7 | Resin C | 200 | 50 | 0 | 50 | ○ | 96 | 0.8 |
| 8 | Resin C | 300 | 50 | 0 | 50 | ○ | 96 | 0.8 |
| 9 | Resin C | 300 | 0 | 80/10000 | 50 | ○ | 96 | 0.8 |
| Comparative | | | | | | | | |
| 1 | Resin D | 200 | 50 | 0 | 50 | x | 96 | 0.8 |
| 2 | Resin D | 200 | 0 | 80/10000 | 50 | x | 96 | 0.8 |
| 3 | Resin D | 200 | 50 | 80/10000 | 50 | x | 96 | 0.8 |
| 4 | Resin C | 200 | 50 | 0 | 50 | ○ | 54 | 0.8 |
| 5 | Resin C | 200 | 50 | 0 | 50 | ○ | 94 | 5.4 |
| 6 | Resin C | 200 | 0 | 0 | 50 | x | 96 | 0.8 |
| 7 | Resin C | 200 | 50 | 0 | 0 | x | 96 | 0.8 |

Comparative Example 4

This example was the same as the above Examples, except that the base paper having a thickness of 175 μm, a width of 300 mm, a whiteness of 50% and a flatness Ra of 5 μm was used.

Comparative Example 5

This example was the same as the above Examples, except that the base paper having a thickness of 175 μm, a width of 300 mm, a whiteness of 90% and a flatness Ra of 30 μm was used.

The low density polyethylene resins used in the above examples were as follows:

| | MI (g/10 min) | Number of Terminal Vinyl Groups | Density (g/cm³) |
|---|---|---|---|
| Resin A | 8 | 0.50 | 0.92 |
| Resin B | 20 | 0.56 | 0.92 |
| Resin C | 50 | 0.60 | 0.92 |
| Resin D | 8 | 0.1 | 0.92 |

Resins A–D: Manufactured by Nippon Polyolefin

Evaluation of Adhesion

Each sample was cut into a width of 15 mm, and the resin membrane was carefully peeled from the base paper, and the degree of adhesion was evaluated into the following three levels.

○. . . Resin membrane was strongly bonded to the paper, and no stringiness occurred.

The support for photographic paper is required to have a whiteness of 80 or more. Moreover, although photographic papers have various areas, those having an inferior flatness are degraded in appearance. Accordingly, it is necessary to have a surface roughness of 2 μm or less at the glossy surface.

From the above results, the following matters were confirmed.

By comparing Example 3, Example 6 and Example 9, it can be seen that the resin having more vinyl groups improves more the adhesion of the resin to the base paper.

As can be seen from Comparative Examples 1–3, the adhesion of the resin having a number of terminal vinyl groups of 0.1 was inferior, nevertheless processed under the same conditions as Examples 1, 4, 7 or good conditions. Particularly, although the resin of Comparative Example 1 had the same MI as Example 1, the adhesion was insufficient.

By comparing Comparative Example 4 with Example 7, it can be seen that a sufficient whiteness could not obtained by using a low whiteness base paper.

By comparing Comparative Example 5 with Example 7, it can be seen that a good surface roughness could not obtained by using the base paper having a great surface roughness.

By comparing Comparative Example 6 with Example 7, it can be seen that the adhesiveness was improved by providing the base paper with corona treatment.

By comparing Comparative Example 7 with Example 7, it can be seen that the adhesiveness was improved by providing the molten resin film with ozone treatment.

In the case of processing at 320° C., 0.08 wt. % Ultramarine Blue and 0.0012 wt. % fluorescent brightening agent were necessary for obtaining the same whiteness.

Examples 10–15, Comparative Examples 8–10, 13, 14

Polyolefin resin compositions were prepared by blending 10 wt. % titanium dioxide, 0.07 wt. % Ultramarine Blue and 0.001 wt. % fluorescent brightening agent with a blend of low density polyethylene resin and 1,2-polybutadiene with varying the blending ratio. Each of the polyolefin resin compositions was melted at 250° C. and laminated in a thickness of 30 μm to a base paper having a thickness of 175 μm, a width of 300 mm, a whiteness of 90% and a flatness Ra of 5 μm.

Comparative Example 11

This example was the same as the above Examples, except that the base paper having a thickness of 175 μm, a width of 300 mm, a whiteness of 50% and a flatness Ra of 5 μm was used.

Comparative Example 12

This example was the same as the above Examples, except that the base paper having a thickness of 175 μm, a width of 300 mm, a whiteness of 90% and a flatness Ra of 30 μm was used.

The blend of low density polyethylene (LDPE) and 1,2-polybutadiene was prepared by blending 1,2-polybutadiene with LDPE having a MI of 20 g/10 min and a density of 0.92 g/cm$^3$ so as to become the following number of intramolecular unsaturated bonds.

Number of Intramolecular unsaturated bonds/1000 carbon atoms

| | |
|---|---|
| Resin E | 0.3 |
| Resin F | 5.0 |
| Resin G | 0.0 | bond was inferior, nevertheless processed under the same conditions as Examples 10, 13 or good conditions.

By comparing Comparative Example 11 with Example 13, it can be seen that a sufficient whiteness could not obtained by using a low whiteness base paper.

By comparing Comparative Example 12 with Example 13, it can be seen that a good surface roughness could not obtained by using the base paper having a great surface roughness.

By comparing Comparative Example 13 with Example 13, it can be seen that the adhesiveness was improved by providing the base paper with corona treatment.

By comparing Comparative Example 14 with Example 13, it can be seen that the adhesiveness was improved by providing the molten resin film with ozone treatment.

In the case of processing at 320° C., 0.08 wt. % Ultramarine Blue and 0.0012 wt. % fluorescent brightening agent were necessary for obtaining the same whiteness.

What is claimed is:

1. A method of producing a support for photographic paper, said support comprising a base having a whiteness of 75% or more and flatness Ra of 20 μm or less, and a polyolefin resin composition membrane comprising (i) a polyolefin resin having a MI of 2 to 100 g/10 minutes and (ii) unsaturated bond at a rate of 0.2 to 0.9 unsaturated bonds per 1,000 carbon atoms, wherein the unsaturated bond is a vinyl group bonded to an end of a polymer chain of polyolefin, said method comprising:
extruding a polyolefin resin composition comprising a polyolefin resin having vinyl groups bonded to an end of a polymer chain of the polyolefin at a rate of 0.2 to 0.9 vinyl group per 1,000 carbon atoms onto

TABLE 2

| | Used Resin | Line Speed [m/min] | Corona Treatment [W/m$^2$ · min] | Flame Treatment [Plasma Index Value/Heat Quantity (BTU/inch · hr)] | Ozone Treatment [mg/m$^2$] | Adhesion | Whiteness [%] | Surface Roughness |
|---|---|---|---|---|---|---|---|---|
| Example | | | | | | | | |
| 10 | Resin E | 200 | 50 | 0 | 50 | ○ | 96 | 0.8 |
| 11 | Resin E | 300 | 50 | 0 | 50 | ○ | 96 | 0.8 |
| 12 | Resin E | 300 | 0 | 80/10000 | 50 | Δ | 96 | 0.8 |
| 13 | Resin F | 200 | 50 | 0 | 50 | ○ | 96 | 0.8 |
| 14 | Resin F | 300 | 50 | 0 | 50 | ○ | 96 | 0.8 |
| 15 | Resin F | 300 | 0 | 80/10000 | 50 | Δ~○ | 96 | 0.8 |
| Comparative | | | | | | | | |
| 8 | Resin G | 200 | 50 | 0 | 50 | x | 96 | 0.8 |
| 9 | Resin G | 200 | 0 | 80/10000 | 50 | x | 96 | 0.8 |
| 10 | Resin G | 200 | 50 | 80/10000 | 50 | x | 96 | 0.8 |
| 11 | Resin F | 200 | 50 | 0 | 50 | ○ | 54 | 0.8 |
| 12 | Resin F | 200 | 50 | 0 | 50 | ○ | 94 | 5.4 |
| 13 | Resin F | 200 | 0 | 0 | 50 | x | 96 | 0.8 |
| 14 | Resin F | 200 | 50 | 0 | 0 | x | 96 | 0.8 |

The support for photographic paper is required to have a whiteness of 80 or more. Moreover, although photographic papers have various areas, those having an inferior flatness are degraded in appearance. Accordingly, it is necessary to have a surface roughness of 2 μm or less at the glossy surface.

From the above results, the following matters were confirmed.

By comparing Example 12 and Example 15, it can be seen that the resin having more intramolecular unsaturated bonds improves more the adhesion of the resin to the base paper.

As can be seen from Comparative Examples 8–10, the adhesion of the resin having no intramolecular unsaturated a base having a whiteness of 75% or more and a flatness Ra of 20 μm or less, wherein at least a surface of extruded molten resin film or the base is subjected to surface treatment prior to laminating.

2. The method of claim 1, wherein the surface treatment of the extruded molten resin film is ozone treatment at 5 to 300 mg ozone/m$^2$.

3. The method of claim 1, wherein the surface treatment of the base is corona treatment at 10 to 80W/m$^2$·min.

4. The method of claim 1, wherein the surface treatment of the base is flame treatment at an output of 3,000 to 40,000 BTU/inch·hr and a plasma index value of 20 to 95.

5. A method of producing a support for photographic paper, said support comprising a base having a whiteness of 75% or more and flatness Ra of 20 μm or less, and a polyolefin resin composition membrane comprising (i) a polyolefin resin having a MI of 2 to 100 g/10 minutes and (ii) a compound containing an unsaturated bond at a rate of 0.2 or more unsaturated bonds per 1,000 carbon atoms selected from the group consisting of polybutadiene, polyisoprene, natural rubber and ethylene propylene-diene terpolymer, said method comprising:

extruding a polyolefin resin composition comprising (i) a polyolefin resin and (ii) a compound containing an unsaturated bond at a rate of 0.2 or more unsaturated bonds per 1,000 carbon atoms selected from the group consisting of polybutadiene, polyisoprene, natural rubber and ethylene propylene-diene terpolymer onto a base having a whiteness of 75% or more and a flatness Ra of 20 μm or less, wherein at least a surface of extruded molten resin film or the base is subjected to surface treatment prior to laminating.

6. The method of claim 5, wherein the surface treatment of the extruded molten resin film is ozone treatment at 5 to 300 mg ozone/m$^2$.

7. The method of claim 5, wherein the surface treatment of the base is corona treatment at 10 to 80 W/m$^2$·min.

8. The method of claim 5, wherein the surface treatment of the base is flame treatment at an output of 3,000 to 40,000 BTU/inch·hr and a plasma index value of 20 to 95.

* * * * *